No. 618,738. Patented Jan. 31, 1899.
E. F. SARGEANT.
MANUFACTURE OF LEATHER BELTING.
(Application filed Apr. 9, 1898.)
(No Model.) 2 Sheets—Sheet 1.

Witnesses
E. A. Pulloch,
H. Harding

Inventor
Edward F. Sargeant,
By Baldwin, Davidson & Wight
Attorneys

No. 618,738. Patented Jan. 31, 1899.
E. F. SARGEANT.
MANUFACTURE OF LEATHER BELTING.
(Application filed Apr. 9, 1898.)

(No Model.) 2 Sheets—Sheet 2.

Witnesses
E. A. Bullock
A. M. Parkins

Inventor
Edward F. Sargeant
By his Attorneys
Baldwin, Davidson & Wight

UNITED STATES PATENT OFFICE.

EDWARD FRANK SARGEANT, OF STROUD, ENGLAND.

MANUFACTURE OF LEATHER BELTING.

SPECIFICATION forming part of Letters Patent No. 618,738, dated January 31, 1899.

Application filed April 9, 1898. Serial No. 677,055. (No model.)

*To all whom it may concern:*

Be it known that I, EDWARD FRANK SARGEANT, engineer, a subject of the Queen of Great Britain, residing at Linden Villa, Lower street, Stroud, in the county of Gloucester, England, have invented certain new and useful Improvements in Leather Belting, of which the following is a specification.

My invention relates to leather belts made from long strips of leather cut spirally out of the hide or butt and joined together by their edges, so that their united widths form the width of the belt. I have heretofore patented a machine for making a leather belt in which such strips were joined together by means of a kind of welt-stitch or by staples driven across the joint for uniting the strips to a suitable backing. A belt made in accordance with my present invention comprises two or more long strips of leather held together edge to edge by a tape or strip of thin material extending across the joint of the strips and entering and cemented within grooves cut along the edge or face of the two strips. Preferably I employ a tape or strip of some textile material having a very strong weft, or other thin tough material may be employed. The tape is secured in place by means of cement. In the manufacture of my improved belt I preferably first cut the strips spirally out of the hide and stretch them. I next cut a groove or recess in each strip parallel with its surface and preferably about midway the substance of the leather. This may be done by any suitable mechanism. After the strips have been cut in this manner the dust made by the tool in forming the groove or recess is carefully brushed out from them. The strips may be joined together by hand or by automatic machinery.

Figure 1:
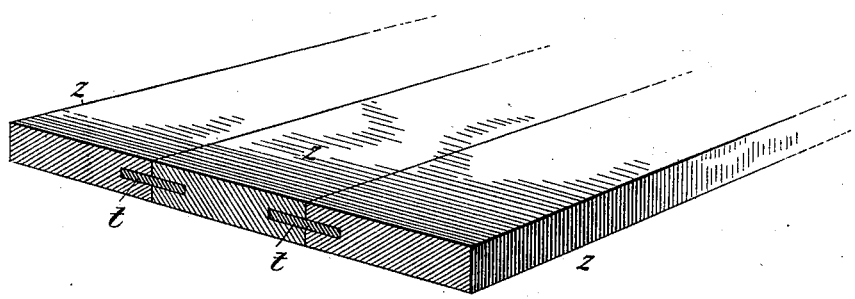
Figure 2:
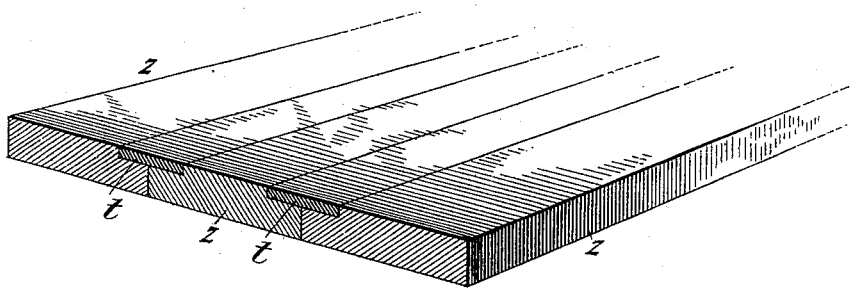
Figure 3:
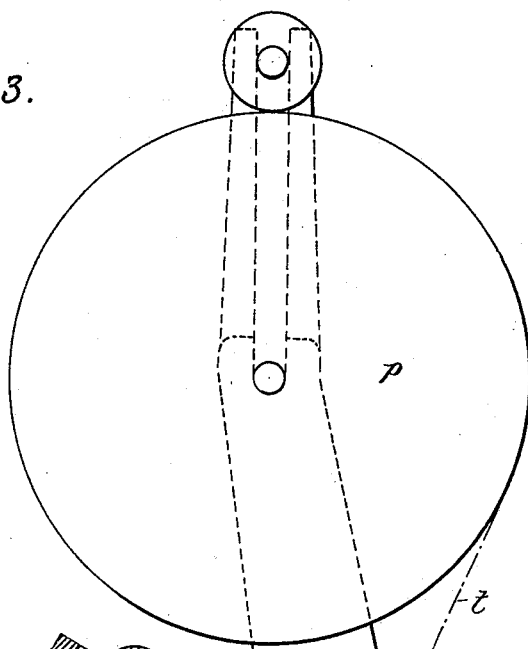
Figure 4:
Figure 5:
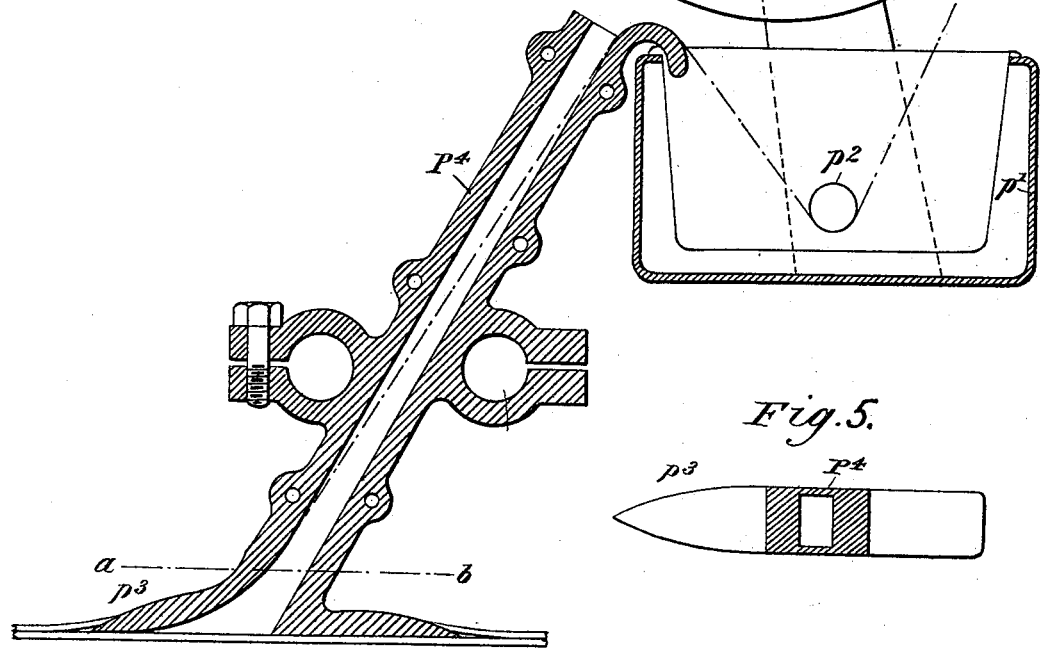

In the accompanying drawings, Figure 1 is a perspective view of a belt constructed in acccordance with my invention. Fig. 2 shows a modification thereof. Fig. 3 is a vertical section of a tape-inserting plow which may be used in the manufacture of the belt. Fig. 5 is a section on the line $a\ b$ of Fig. 3. Fig. 4 illustrates the manner in which the plow lays the tape in the grooves of the strips.

If the strips are to be joined by hand, they may be stretched to long tables, keeping their edges tightly pressed together and securing them in position by wooden pegs driven through the solid part of the strips and into the table. When the strips $z$ are stretched to the tables, I insert the tape $t$ into the grooves in the abutting edges of the strips. If the grooves are in the middle of the substance of the leather, I do this by drawing a metal plow, such as shown in section in Fig. 3, down the two adjacent grooves in such a manner as to turn aside the two upper lips of the grooves, so that they lie vertically against the stem of the plow. This plow $p^4$ is hollow, of rectangular cross-section, and of a width sufficient to let the tape $t$ pass freely down it. The tape is coiled on a spiral $p$ at the top of the stem, which also carries a tray $p'$ of melted cement. The tape passes from the coil under a rod $p^2$, fixed below the surface of the cement and then up to the top of the hollow stem. It passes down this stem and out at the bottom through the shoe $p^3$. In starting this plow it should be first warmed by steam or hot water to the temperature of the cement. The tape is then drawn through the stem and out at the bottom. It is tacked to the table at the end of the strips, and the front end of tongue of the plow is inserted in two adjacent grooves. As the plow is drawn forward the top edges or lips of the leather are turned upward, as shown in Fig. 5, so as to allow the stem to pass between them, and the tape passing out at the bottom of the stem is laid in the bottom of the groove and pressed down by the heel of the plow. The plow is followed up by an attendant who presses down the two top edges of the groove, which at once adhere to the tape by the cement carried down by the latter. This cement will also flow out of the grooves, if the surface of the belt is well rubbed while the cement is still warm, and onto the edges of the strips, so as to cause these edges to adhere to each other, so that the strips are held together by the adhesion of their edges as well as by the tape.

Fig. 1 clearly illustrates how the leather strips $z$ are joined together by the tapes which are cemented in the longitudinal grooves. Instead of arranging tapes in the body of the strips they may be arranged in recesses or grooves in the surface thereof, as illustrated in Fig. 2.

I claim as my invention—

A belt made of two or more long flexible strips of leather held together edge to edge by a tape of thin material extending across the joint and entering and cemented within grooves cut along the longitudinal edges or faces of the two strips.

EDWARD FRANK SARGEANT.

Witnesses:
WILFRED CARPMAEL,
FRED C. HARRIS.